United States Patent [19]

Miller

[11] 4,003,712

[45] Jan. 18, 1977

[54] FLUIDIZED BED REACTOR

[75] Inventor: Adam R. Miller, Indianapolis, Ind.

[73] Assignee: Union Carbide Corporation, New York, N.Y.

[22] Filed: Mar. 14, 1975

[21] Appl. No.: 558,435

Related U.S. Application Data

[63] Continuation-in-part of Ser. No. 64,106, July 29, 1970, abandoned, which is a continuation of Ser. No. 662,045, Aug. 21, 1967, abandoned.

[52] U.S. Cl. .............................. 23/288 S; 526/59; 526/68; 526/88; 526/901
[51] Int. Cl.² ........................................... B01J 8/24
[58] Field of Search ............. 23/288 S, 288 E, 283; 260/94.9 P, 695; 526/59, 68, 88, 901

[56] References Cited

UNITED STATES PATENTS

| | | | |
|---|---|---|---|
| 2,393,839 | 1/1946 | Thomas et al. | 23/288 S X |
| 2,463,912 | 3/1949 | Scharmann | 23/288 S UX |
| 2,785,110 | 3/1957 | Leffer | 23/288 S X |
| 2,891,907 | 6/1959 | Jewell | 23/288 S X |
| 2,985,597 | 5/1961 | Dye et al. | 23/288 S X |
| 3,023,203 | 2/1962 | Dye | 260/94.9 P |
| 3,156,537 | 11/1964 | McLeod | 23/288 E |
| 3,298,792 | 1/1967 | Drusco | 23/288 S X |
| 3,463,617 | 8/1969 | Takeuchi | 23/288 S X |

Primary Examiner—Joseph Scovronek
Attorney, Agent, or Firm—James O'Connell

[57] ABSTRACT

A fluid bed reactor system and process employing a silyl chromate catalyst therein wherein the reactor system comprises a vertical reactor having a fluidizing medium permeable distribution plate towards the base thereof, a fluidizing medium supply line to supply fluidizing medium to the base of the reactor, a catalyst injection means to supply particulate catalyst to the side of the reactor, a polymer product recovery means to recover polymer product from the reactor and beneath the distribution plate, a fluidizing medium recycle line to recycle the fluidizing medium from and to the reactor, and a heat exchanger in the recycle line to remove heat of reaction from the recycled fluidizing medium.

7 Claims, 1 Drawing Figure

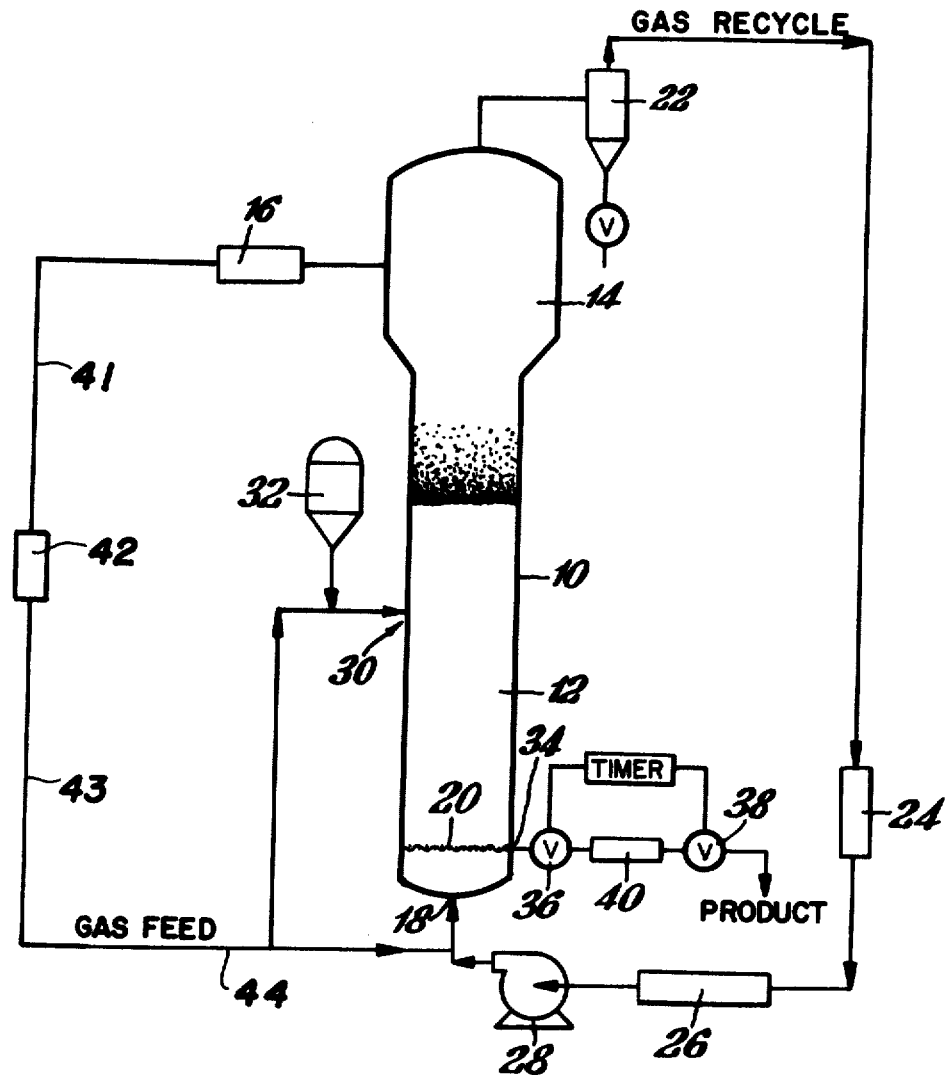

FLUIDIZED BED REACTOR

CROSS REFERENCE TO RELATED PATENT APPLICATIONS

This patent application is a continuation-in-part application of application Ser. No. 64,106 filed July 29, 1970 which is a streamline continuation of application Ser. No. 662,045 filed Aug. 21, 1967, both of said earlier applications being now abandoned.

BACKGROUND OF THE INVENTION

Since Fawcett disclosed the possibility of polymerizing olefins, there have been many significant improvements in olefin polymers and methods for obtaining them.

A milestone was the introduction by Ziegler of a transition metal catalyst which would produce high molecular weight solid polymers at low pressures. Other low pressure catalysts have since emerged each providing advantages and at times disadvantages over the catalyst system proposed by Ziegler.

The advent of the low pressure catalyst systems focused new attention on processes for polymerizing olefins. The most significant commercial process to date is the slurry process wherein a polymer is prepared in a solvent under constant stirring in the presence of a low pressure catalyst. The most inherent deficiency in the slurry process is the solvent which must be recovered at some operating cost and at the expense of solvent depletion. Some solvent may also remain in the polymer thereby affecting the physical properties of product. The physical properties of the slurry also complicates this deficiency and most slurry reactors are operated at a high solvent content to insure that an agitatable mass will be maintained.

It must be appreciated therefore that a solvent free, low pressure reaction system would offer advantages over the slurry process.

U.S. Pat. No. 3,023,203 proposes such a system. It proposes a process wherein an olefin is polymerized in a three-zone vapor phase reactor comprising a lower product collection zone from which a self-deposited polymer product is extruded without a pressure drop, an intermediate reaction zone and an upper knock-out zone for returning "fines" to the reaction zone. The fluidizable catalyst system comprises a hexavalent chromium-oxide catalyst disclosed in U.S. Pat. No. 2,825,721 deposited on a carrier having a particle size of up to 40 mesh. According to the process a polymer is allowed to grow on a catalyst particle until it becomes large enough to drop from the reaction zone into the product collection zone.

A difficulty with such a process is that the particles which settle in the product collection zone may still be active and growing. Since heat transfer is low in such a quiescent mass, the generated heat of reaction there is likely to cause fusion of particles thereby plugging the product collection zone.

A vapor-phase polymerization process has also been proposed in British patent specification No. 910,261, wherein a Ziegler catalyst is shown to cause the formation of olefin polymers in a fluidized bed reactor. The retention of catalyst by the polymer product, however, imposes a limitation on this process. Since the Ziegler catalyst is corrosive to molds and the like, the catalyst residue must be removed from the polymer by solution and washing thereby obviating much of the advantage provided by vapor-phase polymerization.

The problems outlined above have heretofore substantially prevented the commercial exploration of low-pressure vapor-phase reactors for the polymerization of olefins.

SUMMARY OF THE INVENTION

It has now been found that solid particulate olefin polymers of low, non corrosive catalyst residue content can be obtained by continuously contacting a gaseous stream containing a polymerizable olefin with a powdery silyl chromate catalyst for said olefin in a polymerization zone comprising a fluidized bed of formed and forming polymer particles at a mass gas flow rate sufficient to maintain complete fluidization, withdrawing from the polymerization zone a small portion of the fluidized bed as discrete polymer particles in suspension with a portion of the gaseous stream and subsequently separating the discrete polymer particles from the gaseous mobilizer. That portion of the gaseous stream which does not enter into the polymerization reaction is removed from the reaction zone, cooled to remove the heat of reaction and recycled below the base of the fluidized bed to maintain complete fluidization of the bed and to maintain the bed at a temperature below the sintering temperature of the polymer particles. To maintain an essentially steady state operation, make-up feed gas and powdery catalyst are fed to the fluidized bed respectively at rates equal to the rate of product formation and cataflyst consumption. The make-up catalyst is fed to the fluidized bed above the base of the bed to achieve rapid catalyst distribution throughout the bed.

In addition to being non-corrosive, the catalyst residue in the polymer particles produced according to this invention is sufficiently low to allow the polymer particles to be used directly without treatment for catalyst removal.

Another embodiment of this invention is the use of hydrogen to control the melt index and melt flow characteristics of polymers produced in a fluidized bed reactor.

THE DRAWINGS

This invention, its features and advantages will be more clearly understood by reference to the following description and the attached drawing which illustrates the schematic operation of a fluidized bed reactor used in the practice of this invention.

DESCRIPTION

This invention relates to the continuous production of high molecular weight particulate polymers of olefins by feedng a powdery silyl chromate catalyst and a gaseous stream containing a polymerizable olefin to a fluidized bed of polymer particles and removing heat and dry particulate polymer particles.

Any polymerizable olefin can be used in this process, preferably those olefin containing from 2 to about 8 carbon atoms, and even more preferably those containing from 2 to 4 carbon atoms. It only is essential that the olefins be gaseous and polymerize at a temperature below the sintering temperature of the resultant polymer and form essentially dry particulate resin particles essentially free of low molecular weight waxes and greases.

Olefins can be homopolymerized or copolymerized. Copolymers include the formation of polymers from two or more monomers such as random copolymers as well as the production of specialty polymers. For instance, different monomers may be sequentially introduced to a single fluidized bed to form block copolymers. Another expedient is to transfer resin from a reactor containing one monomer through a suitable valve into a reactor containing another monomer with negligable carry over of monomer from one reactor to another. This latter expedient may also be effectively used to form mixtures of polymers. Both alternatives are particularly useful in forming block copolymers and mixtures of polymers from monomers of different reactivities.

The polymerization can be carried out in the presence of hydrogen which can be used to effectively control the melt index of the polymer and enhance the reactivity of monomers of low reactivity in the production of copolymers.

The catalysts used in the practice of this invention are the silyl chromate catalysts disclosed in U.S. Pat. No. 3,324,101 to Baker and Carrick and U.S. Pat. No. 3,324,095 to Carrick, Karapinka and Turbett which are hereby incorporated by reference. The silyl chromate catalysts are characterized by the presence therein of a group of the formula:

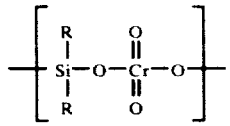

wherein R is hydrocarbyl group having from 1 to 14 carbon atoms. The preferred silyl chromate catalysts are the bis triarylsilyl chromates and more preferably bistriphenylsilyl chromate.

The silyl chromate catalysts used in the practice of this invention are in the form of powdery free flowing solid particles and are preferably capable of subdivision. Subdivision is the ability of the catalyst particles to rupture in the presence of a growing polymer and thereby extend itself to form many polymer particles of low catalyst residue content from a single catalyst particle. The catalyst may be supported on a carrier or unsupported as ground or spray dried particles.

Supported catalysts are prepared, for instance, by adding a carrier to a solution of the catalyst and evaporating the catalyst solvent with dry nitrogen to yield a supported catalyst in the form of a dry, free flowing powder. If the carrier is porous, careful consideration must be given to the size of the support. When incorporated in a porous support, the catalyst forms active sites on the surface and in the pores of the support. While not wishing to be bound with this theory, it is believed that the polymers begin to grow at the surface as well as in the pores of the catalyst. When a pore grown polymer becomes large enough, it ruptures the support thereby exposing fresh catalyst sites in the inner pores of the support. The supported catalyst during its life time in the bed may thus subdivide many times and enhance thereby the production of low catalyst residue polymers thereby eliminating the need for recovering the catalyst from the polymer particle. If the support is too large, it may resist rupture thereby preventing subdivision which would result in catalyst waste. In addition, a large support may act as a heat sink and cause "hot spots" to form. It has been found that supports having a particle size in the order of 250 microns or less display an ability to effectively rupture under the force of a growing polymer.

Besides porous supports such as silica, alumina, thoria, zirconia and the like, other supports such as carbon black, micro-crystalling cellulose, the non-sulfonated ion exchange resins and the like may be used.

In selecting the catalyst support, consideration must also be given to the possibility of competing reactivity of the support for the olefin. Silica, for instance, tends to compete with the catalyst when propylene is being polymerized as the sole monomer and tends to cause the formation of low molecular weight polypropylene waxes. Its use, therefore, should be avoided in the preparation of polypropylene. It does not, however, appear to adversely affect the catalyst where copolymers of ethylene and propylene are produced.

A support also serves to extend the catalyst. For instance, catalysts extended by the use of a silica support have been found active with the ratio of chromium to silica is as high as 1:1000.

An unsupported catalyst is prepared, for instance, by spray drying the catalyst or spraying the catalyst directly into a bed of polymer particles and evaporating the catalyst solvent. Both techniques produce dry catalysts which are capable of subdivision. When the catalyst is spray dried, care must be taken to form particles of a size sufficient to remain in the fluidized bed rather than move to the head of the bed under existing continuous gas flow and thereby escape the bed before inception of the formation of a polymer thereon. Resin deposited catalysts present less of a problem since the particulate polymer particles are used in the fluidized bed and act as the initial carrier for the catalyst.

A fluidized bed reaction system used in the practice of this invention is illustrated in the Drawing. With reference thereto, the reactor 10 consists of a reaction zone 12 and a velocity reduction zone 14. The reaction zone or lower section 12 may have a diameter to height ratio of about 1:6 to 1:7.5 and the velocity reduction zone or upper section 14 may have a diameter to height ratio of about 1:1 to 1:2.

The reaction zone 12 comprises a bed of growing polymer particles, formed polymer particles and a minor amount of catalyst fluidized by the continuous flow of polymerizable and modifying gaseous components in the form of make up feed and recycle gas through the reaction zone. To maintain a viable fluidized bed, mass gas flow through the bed is above the minimum flow required for fluidization, preferably from about 2 to about 6 times $G_{mf}$ and more preferably from about 3 to about 5 $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the powdery catalyst of this invention throughout the reaction zone. On start up, the reaction zone is usually charged with a base of particulate polymer particles before gas flow is initiated. The particles may be identical in nature to the polymer to be formed or different. When different, they are withdrawn with the desired formed polymer particles as the first product. Eventually, a fluidized bed of the desired particles supplants the start-up bed.

Catalyst concentration in the bed is substantially equal to the catalyst concentration in the product, namely in the order of about 0.005 to about 0.50 percent of bed volume depending on the productivity of the particular catalyst used.

The catalyst used in the fluidized bed is stored for service in a reservoir 32 under a nitrogen blanket.

Fluidization is achieved by a high rate of gas recycle to and through the bed, typically in the order of about 50 times the rate of feed of make up gas. The fluidized bed has the general appearance of a dense mass of viable particles in possibly free-vortex flow as created by the perculation of gas through the bed. Free flow of particles and therefore fluidization is substantiated by the fact that axial pressure drop through the bed is typically in the order of only about 1 psig.

Make up gas is fed to the bed at a rate equal to the rate at which particulate polymer product is withdrawn. The composition of the make up gas is determined by a gas analyzer 16 positioned above the bed. The gas analyzer determines component deficiency in the gas being recycled and the composition of the make up gas is adjusted accordingly to maintain an essentially steady state gaseous composition within the reaction zone. The composition of the make up gas can be adjusted by signals sent from gas analyzer 16 over line 41 to the sources 42 of the components of the gas feed, from whence such components can be fed over line 43 to gas feed line 44.

To insure complete fluidization, the recycle gas and, where desired, part of the make up gas are returned to the reactor at point 18 below the bed. There exists a gas distribution plate 20 above the point of return to aid in fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then passed through a heat exchanger 26 wherein it is stripped of heat of reaction before it is returned to the bed. By constantly removing heat of reaction, no noticable temperature gradient appears to exist within the bed. In particular, it has been observed that the bed acts to almost immediately adjust the temperature of the recycle gas to make it conform to the temperature of the bed thereby maintaining itself at an essentially constant temperature under steady state conditions. The recycle gas is then compressed in a compressor 28 and returned to the reactor at its base 18 and to the fluidized bed through a distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to support a quiescent bed of resin particles when the reactor is not in operation.

In addition to a polymerizable olefin, hydrogen as a component of the gas stream is of significant utility in the vapor phase polymerization of olefins in the fluidized bed reactor. In vapor phase polymerization processes the melt index of the product is relatively insensitive to the operating temperature in that a moderate change in operating temperature will not result in any significant change in the melt index of the product. Therefore, an alternate means to modify, where desired, melt index must be resorted to. It has been found that when a silyl chromate catalyst is used, hydrogen influences the melt index of the product. In general, the melt index of the product increases with an increase in the hydrogen concentration in the gas stream.

Also if desired for control in the system, any gas inert to the catalyst and reactants can be present.

When making copolymers of ethylene and propylene, or other monomers of lower reactivity, the presence of hydrogen has also been found to enhance the reactivity of the monomer of lower reactivity.

It is essential to operate at a temperature below the sintering point of the polymer particles. To insure that sintering will not occur, operating temperatures considerably below the sintering temperature are desired. For the production of homopolymers an operating temperature of from about 90° to about 110° C. is preferred whereas an operating temperature of about 90° C. or lower is preferred for copolymers.

Operation is at a pressure of from about 40 to 300 psi or more with operation at intermediate and elevated pressures favoring heat transfer since an increase in pressure increases the unit volume heat capacity of the gas.

Catalyst is injected into the bed at a rate equal to its consumption at a point 30 which is above the distribution plate 20. Preferably, the catalyst is injected at a point about ¼ to ¾ of the height of the bed. Injecting the catalyst at a point above the distribution plate is an important feature of this invention. The silyl chromate catalysts used in the practice of the invention are highly active. Injection into the area below the distribution plate may cause polymerization to begin there and eventually cause plugging of the distribution plate. Injection into a viable bed instead aids in distributing the catalyst throughout the bed and tends to preclude the formation of localized spots of high catalyst concentration which may result in the formation of "hot spots".

All or part of the make up feed stream is used to carry the catalyst into the bed. It is preferred to use only part of the make up feed stream as the carrier for the catalyst since at high productivities, the injection of a large amount of gas into the side of the bed may disrupt the characteristics of the bed and cause channeling or the like. In the alternative, part of the recycle gas stream can be diverted for the purpose of carrying catalyst into the bed.

The productivity of the bed is solely determined by the rate of catalyst injection. The productivity of the bed may be increased by simply increasing the rate of catalyst injection and decreased by reducing the rate of catalyst injection.

Since any change in the rate of catalyst injection will change the rate of generation of heat of reaction, the temperature of the recycle gas is adjusted upwards or downwards to accommodate the change in rate of heat generation. This insures the maintenance of an essentially constant temperature bed. Complete instrumentation of both the fluidized bed and the recycle gas cooling system is, of course, necessary to detect any temperature change in the bed to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a thermal analysis of the gas leaving the reactor is determinative of the rate of particulate polymer formation.

The particulate polymer product is preferably continuously withdrawn at a point 34 at or close to the dispersion plate 20 in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 opens to emit a plug of gas and product to the zone 40 between it and valve 36 which then closes. Valve 38 opens to deliver the product to an external recovery zone and then it closes to wait the next sequence.

Finally the fluidized bed reactor is equipped with an adequate vent system to allow venting the bed during start up and shut down.

The silyl chromate catalyst system of this invention appears to yield a product having an average particle size of about 40 mesh wherein catalyst and carrier residue is unusually low. Catalyst residue has been found to be in the order of about 0.001 percent chromium by weight in the product of this invention. The low residual catalyst content is attributed to the high productivity of the silyl chromate catalyst and its ability to subdivide. Productivities in excess of 2000 pounds of polymer per pound of catalyst have been observed.

In operating the fluidized bed reactor of this invention several advantages have been observed when compared to current slurry and solution processes.

A major observation is that there appears to be no tendency for the polymer to coat the reactor walls. The formation of a polymer coat on the walls of slurry and solution reactors is a relatively uncontrollable and unpredicable phenomenon which hinders heat transfer and may cause clumps of polymer to "break-off" into the system.

On a production line basis the fluidized bed reactor appears to offer reduced installation and operating costs.

It is also more stable in that it tends to naturally dampen any sudden change in operating conditions. There appears therefore more leeway in operating the fluidized bed reactor.

Finally, a most significant advantage is an improved ability to control gas composition. Gas composition in the slurry and solution reactors is limited by monomer solubility and diffusivity. Since there are no liquids in the fluidized bed reactor gas composition is essentially infinitely variable and the practical gas compositions are effected only by the relative reactivities of the monomers present.

The following Examples are designed to illustrate the preparation of the catalysts used in the practice of this invention, the technique of operating the fluidized bed reactor of this invention and to illustrate the properties of polymers produced in the practice of this invention.

The properties of the polymers produced in the Examples were determined by the following test methods:
Density—ASTM D-1505 — Plaque is conditioned for 1 hour at 120° C. to approach equilibrium crystallinity.
Melt Index—ASTM D-1238 — Measured at 190° C. — reported as grams per 10 minutes.
Flow Rate—ASTM D-1238 Measured at 10 times the weight used in the melt index test above.
Flow Ratio=Flow Rate/Melt Index
Stiffness—ASTM D-638
Tensile Strength—ASTM D-638
Yield Strength—ASTM D-638
Elongation—ASTM D-638
Tensile Impact—ASTM D-256— Specimen is not notched and is clamped in an Izod Impact Tester in such a way that it is broken in tension.
Color: This is a determination of yellowness and whiteness by means of an abridged Beckman Model B Spectrophotometer modified for reflectance measurements. A Vitrolite reflectance standard obtained from the National Bureau of Standards is used for adjusting and calibrating the instrument. Reflectance is measured on suitable plaques at 430 and 550 millimicrons. Whiteness is the value of percent reflectance at 550 millimicrons. Yellowness is percent reflectance at 550 minus percent reflectance at 430 millimicrons. This test is used for quality control work. The test is similar to ASTM D-1925-63T.

EXAMPLE 1 1000 grams of a silica base of the following composition:

| Component | Weight Per Cent, Dry Basis |
|---|---|
| Al$_2$O$_3$ | 0 |
| SiO$_2$ | 99.95 |
| Na$_2$O | 0.05 |
| So$_4$ (water soluble) | 0 | and with the physical properties of:

| Mesh Size, U.S. Standard | Weight Per Cent Larger Than |
|---|---|
| 60 | 0.0 max. |
| 100 | 4.0 max. |
| 140 | 10.0 max |
| 200 | 9–33 |
| Surface Area | 338 sq. meter per gram |
| Pore Diameter (av.) | 170 Angstroms | which had been dried in a nitrogen atmosphere at temperatures which ranged from 325° to 700° C. was added with stirring and under a nitrogen blanket to 4 liters of isopentane contained in a 5-liter flask equipped with a sintered glass filter in its base. 41.5 millimoles of bistriphenylsilyl chromate was added and stirring continued for about 1 hour.

In a second flask, jacketed for cooling and well flushed with dry nitrogen, 585 millimoles of triethylaluminum was dissolved in 200 ml. of isopentane. While agitating the solution vigorously and with cooling to hold the temperature at about 25° C., 570 millimoles of ethanol was added to form ethoxydiethylaluminum which was then added to the suspension of silica and bistriphenylsilyl chromate in the 5-liter flask. After stirring for 30 minutes, the solvent was drained through the sintered glass filter, tested and found to be essentially free of aluminum and chromium. The residue was slightly warmed and dry nitrogen slowly blown therethrough until a free-flowing, essentially dry powder supported catalyst was obtained.

The following Examples illustrate the production of olefin polymers in a fluidized bed reactor using the powdery particulate catalyst prepared in Example 1.

EXAMPLES 2 to 5

For these Examples, a jacketed reactor similar to that depicted in the drawing with a reaction section having a diameter to height ratio of about 1:7.5 and an upper section having a diameter to height ratio of about 1:2 was typically operated at a pressure of about 100 psi at a gas flow rate between 3 and 4 $G_{mf}$. Homopolymers were produced at temperatures of from 90° to 110° C. while copolymers were produced at 80° C. or lower. Hydrogen was used to control melt index.

Examples of polymers produced in this reactor appear in Table I.

section 3.5 feet in diameter and 3.5 feet high was used in the following Examples. The fluidized resin bed in the reactor section was from 7 to 10 feet deep and supported by a 60 mesh stainless steel wire screen which was in turn supported by steel bars.

The reactor was prepared for use by filling it with clean, dry particulate polyethylene. The moisture and oxygen content of the bed was reduced by recirculating nitrogen or ethylene at 80° to 90° C. and venting until moisture content is reduced to 50 to 100 ppm. The bed was further conditioned by fluidizing the particulate polyethylene with nitrogen at 80° to 100° C. while adding sufficient triethylaluminum to react with all the moisture and other trace poisons that may remain. The nitrogen was then vented and the monomer feed started followed by the start of the catalyst feed into the side of the bed thereby initiating the reaction.

As the polymerization proceeded, the original particulate polyethylene bed was supplanted by the newly formed polymerized particles of the desired polymer and was withdrawn as part of the product. Eventually, the bed became filled with product formed from the monomer feed. Hydrogen was used in many Examples to control melt index and molecular weight.

Examples 6 to 8 as summarized in Table II show polymers produced in this reactor following the procedures set forth above using the catalyst prepared in Example 1.

Examples 9 to 15 as summarized in Table III illustrate the productivity studies in a 2-foot diameter reactor. In these studies, polyethylene was produced by feeding 100 per cent ethylene at a gas superficial mass viscosity of 1590 lb/hr sq. ft. or 3.8 $G_{mf}$ to a reactor maintained at a temperature of about 100° C. and at a reactor pressure of 100 psig.

TABLE I

| | Homopolymers | | Copolymers | |
|---|---|---|---|---|
| Example | 2 | 3 | 4 | 5 |
| Product | Polyethylene | Polyethylene | Ethylene-Propylene | Ethylene-Propylene |
| Melt Index | 0.05 | 0.49 | 0.82 | 9.6 |
| Flow Rate | 8.2 | 58.1 | 92.9 | 826 |
| Flow Ratio | 162 | 119 | 113 | 86 |
| Density | 0.9670 | 0.9690 | 0.9493 | 0.9349 |
| Stiffness | 160,000 | 168,000 | 86,000 | 58,000 |
| Tensile Impact | 109 | 42 | 49 | 35 |
| Color - Whiteness | — | — | — | — |
| Yellowness | — | — | — | — |
| Propylene Content | — | — | 4.2 | 6.8 |
| Average Reactor Conditions | | | | |
| Temperature ° C. | 88 | 95 | 80 | 81 |
| Pressure, Psi | 100 | 100 | 100 | 100 |
| Hydrogen Content Vol.% | 5.0 | 19.4 | 10 | 10 |
| Propylene Content Vol.% | — | — | 10 | 20 |
| Ethylene Content Vol.% | 95.0 | 80.6 | 80 | 70 |

EXAMPLES 6 to 15

A larger fluid bed reactor having a lower reactor section 2 feet in diameter and 12 feet high and a top

TABLE II

| | Homopolymers | | Copolymer |
|---|---|---|---|
| Example | 6 | 7 | 8 |
| Product | Polyethylene | Polyethylene | Ethylene-Propylene |
| Melt Index | 0.18 | 0.98 | 0.31 |
| Flow Rate | 26.1 | 73 | 39.4 |
| Flow Ratio | 221 | 75 | 127 |
| Density | 0.9604 | 0.9643 | 0.9513 |
| Stiffness, Psi | 137,000 | 177,000 | 103,000 |
| Tensile Impact | 79 | 48 | 74 |
| Color - Whiteness | 90 | 97 | 89 |
| Yellowness | −1 | −3 | −5 |
| Propylene Content Wt.% | Nil | Nil | 1.85 |
| Tensile Strength, Psi | — | — | 3060 |

TABLE II-continued

| Example | Homopolymers 6 | Homopolymers 7 | Copolymer 8 |
|---|---|---|---|
| Yield Strength, Psi | — | — | 3060 |
| Elongation, % | — | — | 360 |
| Average Reactor Conditions | | | |
| Temperature, °C. | 93 | 100 | 80 |
| Pressure, Psi | 100 | 100 | 100 |
| Hydrogen Content Vol.% | 5.0 | 20 | 1.5 |
| Propylene Content Vol.% | Nil | Nil | 5 |
| Ethylene Content Vol.% | 95.0 | 80.0 | 93.5 |
| Superficial Mass Velocity in Bed, $G_{mf}$ | 3.5 | 3.5 | 3.5 |
| Production Rate, 1#/hr | 57 | 58 | 49-1/2 |
| Space-Time Yield, lb/hr/cu. ft. | 2.3 | 2.3 | 2.0 |
| Catalyst Productivity, lb/lb | 1000 | 2000 | 2000+ |

TABLE III

| Example | Bed Depth Feet | Hrs. Run | Gas ΔT Inlet to Outlet | Lb. Hr. | Production Lb. (Hr) (Cu Ft) | Lb. Resin Lb. Catalyst | Temp. Gradient in Bed |
|---|---|---|---|---|---|---|---|
| 9 | 10 | 10-1/2 | 35° C. | 76.5 | 2.44 | 830 | 3° C. |
| 10 | 10 | 8 | 54 | 95 | 3.03 | 1700 | 5 |
| 11 | 10 | 20 | 40 | 91.5 | 2.90 | 2400 | 9 |
| 12 | 10 | 8 | 43 | 104 | 3.30 | 1840 | 6 |
| 13 | 8 | 8 | 35 | 89.5 | 3.60 | 1140 | 4 |
| 14 | 8 | 10 | 43 | 97 | 3.86 | 1050 | 10 |
| 15 | 8 | 21 | 41 | 83 | 3.30 | 1390 | 5 |

EXAMPLE 16

To show the effect of hydrogen on melt index, ethylene was polymerized in the presence and absence of hydrogen in the fluidized bed reactor used in Example 2–5. The reactions were carried out at a pressure of 100 psig. and at 110° C. The results are listed in Table IV which shows that the presence of hydrogen in the vapor phase fluidized bed reactor causes an increase in melt index when a silyl chromate is used as the catalyst.

TABLE IV

| %$H_2$ | Melt Index | Flow Rate | Flow Ratio | Density | Stiffness | Tensile Impact | Intrinsic Viscosity |
|---|---|---|---|---|---|---|---|
| 0 | 0.00 | 3.5 | — | 0.9659 | 149,000 | 111 | — |
| 7.7 | 0.09 | 14 | 156 | 0.9641 | 139,000 | 129 | 3.5 |
| 8.0 | 0.26 | 40 | 153 | 0.9718 | 163,000 | 56 | 2.9 |

EXAMPLE 17

To show the distribution of particle size of the product, a particulate polyethylene product was subjected to a screen analysis with the following results:

| Product Distribution (mesh) | Per Cent of Product |
|---|---|
| >12 | 2.6 |
| <12, >20 | 10.3 |
| <20, >40 | 23.3 |
| <40, >100 | 58.8 |
| <100 | 5.0 |

The elements of the distribution plate 20 shown in the drawing may all be stationary, or the plate may be of the mobile type disclosed in U.S. Pat. No. 3,298,792. The mobile elements of the plate may be used to dislodge any polymer particles entrapped in or on the plate.

The reactor 10 shown in the drawing does not require the use of stirring means and/or wall scrapping means therein.

What is claimed is:

1. A fluid bed reactor system in which olefin monomers may be catalytically polymerized continuously in a fluid bed under gas medium fluidized conditions, and comprising a vertical reactor having a cylindrical lower section and an upper section have a cross section greater than that of said lower section, said lower section being adapted to house a polymerization zone in which the catalyzed polymerization reaction may be conducted under gas medium fluidized fluid bed conditions, and said upper section being adapted to function as a velocity reduction zone for the recovery of particles entrained in fluidizing medium entering said upper section from said lower section, fluidizing medium permeable distribution plate means within and towards the base of said lower section, said distribution plate means being adapted to diffuse fluidizing medium up through the fluidized bed in said lower section and to support said bed thereon when said bed is quiescent, fluidizing medium supply line means in gas communication with, and adapted to supply fluidizing medium and make up gas to, the lower section of said reactor and below said distribution plate means, catalyst injection means in catalyst supply communication with, and adapted to supply particulate olefin polymerization catalyst to, the side of the fluidized bed in the polymerization zone in said lower section, polymer product recovery means in polymer product recovery communication with, and adapted to recover polymer product from, the base of said polymerization zone and above said distribution plate means, said polymer product recovery means comprising a valved chamber which is adapted to recover polymer product from said reactor at a rate equal to the rate of polymer product formation with the aid of a pressure differential between the pressure within said reactor and the pressure within said chamber, fluidizing medium recycle line means in gas communication with said reactor and adapted to recover fluidizing medium from the upper section of said reactor and to recycle the thus recovered fluidizing medium to the lower section of said reactor at a point below said distribution plate means, heat exchange means within said recycle line means adapted to remove heat of reaction from the recycled fluidizing medium, gas analyzer means in gas communication with said velocity reduction zone and adapted to analyze gas component deficiency in the fluidizing medium in sad velocity reduction zone, and said fluidizing medium supply line means being in gas communication with said recycle line means and in gas supply activating response communication with said gas analyzer means and adapted to supply deficient components of the fluidizable medium to said recycle line means in response to gas supply activating communication from said gas analyzer means.

2. A fluid bed reactor system as in claim 1 in which said vertical reactor is adapted to accommodate a minimum mass gas flow rate through a fluidized bed therein in the range of 2 to about 6 $G_{mf}$.

3. A fluid bed reactor system as in claim 2 in which said lower section of said reactor has a diameter to height ratio of about 1:6 to 1:7.5 and said upper section of said reactor has a diameter to height ratio of about 1:1 to 1:2.

4. A fluid bed reactor system as in claim 1 in which said vertical reactor is adapted to operate under a pressure in the range of 40 to 300 psi.

5. A fluid bed reactor system as in claim 1 in which said catalyst injection means is adapted to supply the catalyst to the polymerization zone at a point which is abut ¼ to ¾ of the height of the fluidized bed in said polymerization zone.

6. A fluid bed reactor system as in claim 5 in which said catalyst injection means is adapted to supply catalyst to the polymerization zone at a rate equal to the rate of catalyst consumption.

7. A fluid bed reactor system as in claim 1 in which said fluidizing medium supply line means and said fluidizing medium recycle line means are adapted to use common gas communication line means at their point of gas communication with the lower section of said reactor.

* * * * *

Disclaimer 4,003,712.—*Adam R. Miller*, Indianapolis, Ind. FLUIDIZED BED REACTOR. Patent dated Jan. 18, 1977. Disclaimer filed Apr. 24, 1980, by the assignee, *Union Carbide Corporation*.

Hereby enters this disclaimer to all claims of said patent.

[*Official Gazette, June 17, 1980.*]